April 27, 1965   W. L. LINDLEY   3,180,391
ARRANGEMENT FOR SUPPORTING A TUBELESS TIRE ON A WHEEL RIM
Filed Oct. 24, 1963   2 Sheets-Sheet 1
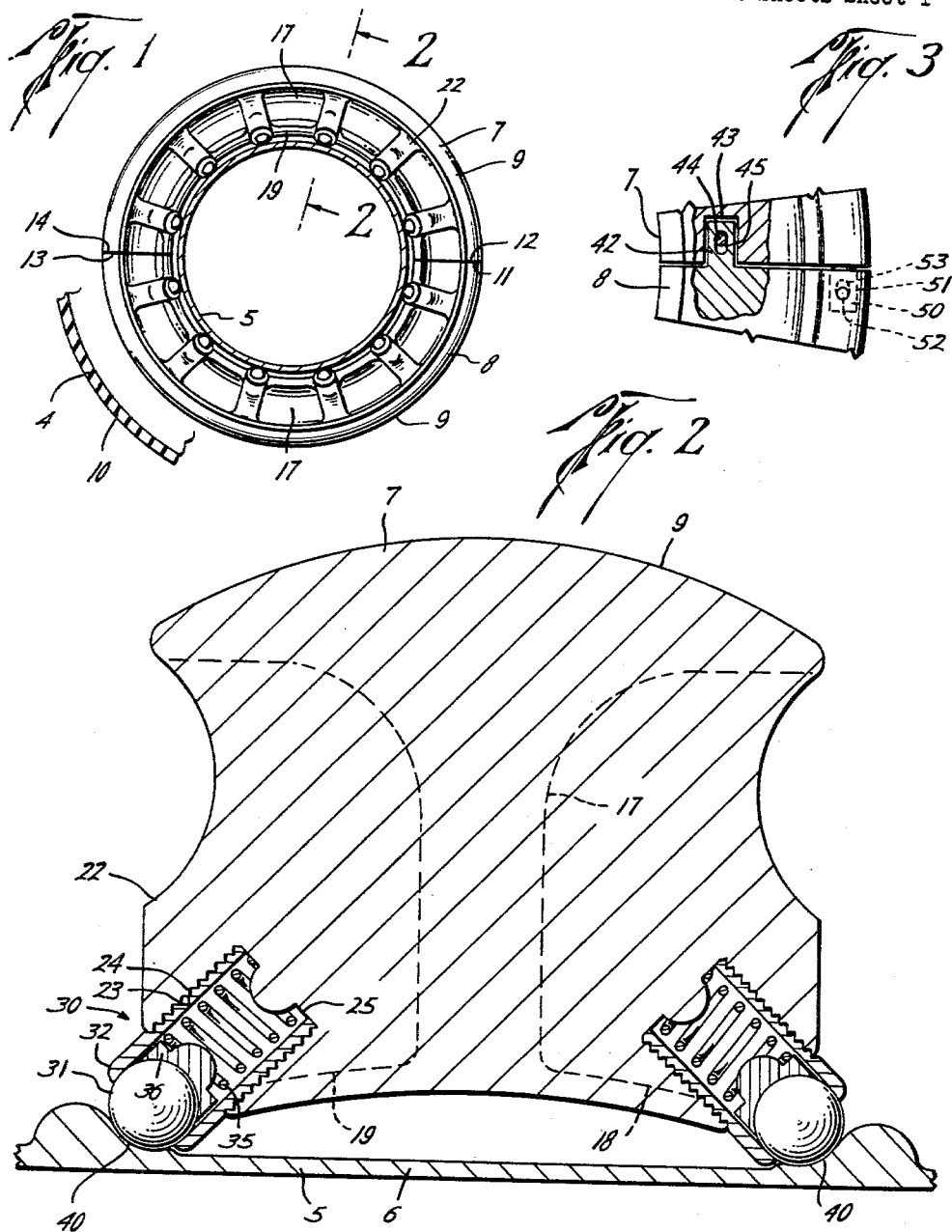
William L. Lindley
INVENTOR.
BY Hayden & Powell
ATTORNEYS

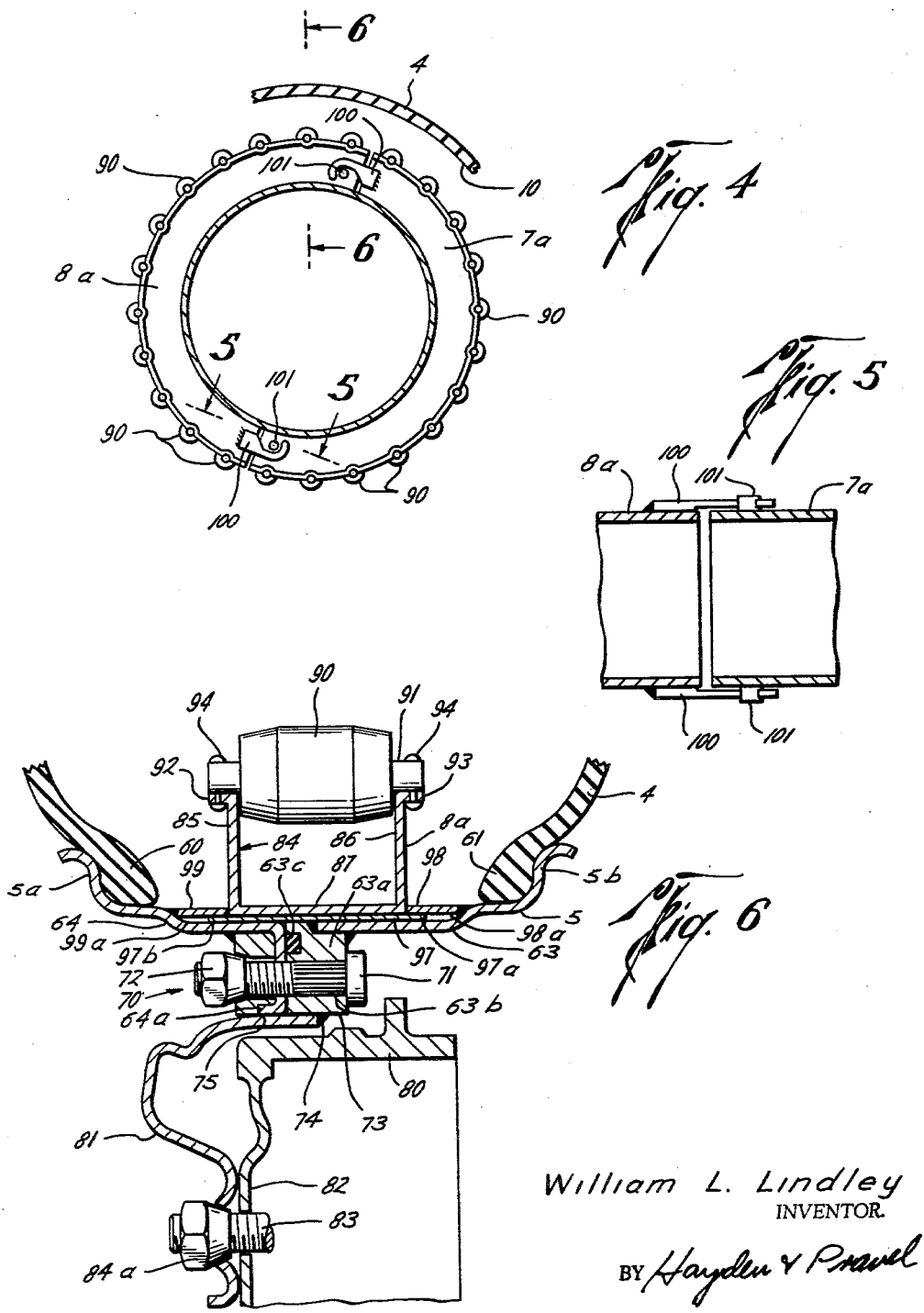

United States Patent Office 3,180,391
Patented Apr. 27, 1965

3,180,391
ARRANGEMENT FOR SUPPORTING A TUBE-
LESS TIRE ON A WHEEL RIM
William L. Lindley, 711 Taft, Houston, Tex.
Filed Oct. 24, 1963, Ser. No. 319,919
4 Claims. (Cl. 152—158)

The present invention relates to an arrangement for supporting a deflated tubeless tire on a wheel rim in a manner to inhibit damage thereto during rotation of the wheel, and more particularly, it relates to an improvement in my prior invention in U.S. Letters Patent No. 2,986,189, issued on May 30, 1961.

My copending application for United States Letters Patent in "Wheel Rim Attachment for a Tubeless Tire" filed on November 6, 1961, and bearing Serial No. 150,-262, now Patent No. 3,142,326, discloses and claims a construction wherein a means is provided for aiding in supporting a deflated tire on a wheel rim in a manner so that as the wheel rotates, the tire will "pass" around the rim in a manner to inhibit damage thereto.

The present application is a continuation-in-part of my prior copending application for patent bearing Serial No. 196,202, filed May 21, 1962, now abandoned, for "Arrangement for Supporting a Tubeless Tire on a Wheel Rim" and is entitled to the filing date of said application as to all common subject matter.

In extremely heavy vehicles and carriers such as trucks and airplanes, it is desirable to provide some means for supporting a tubeless tire when it deflates on a wheel rim in a manner so as to inhibit damage thereto. It can be appreciated that in heavy vehicles and carriers such as trucks and airplanes, the problems of proper support of a deflated tubeless tire on a wheel rim in a manner so as to inhibit damage thereto are greatly accentuated. Also, other problems of "shock loading" are encountered, particularly in the event an airplane descends and lands with a deflated tire. In this situation, it is extremely important that a safe landing be made and that the landing be accomplished without any substantial damage to the tire.

The present invention provides a support arrangement for a wheel rim to aid in supporting a deflated tubeless tire on the wheel rim in a manner to inhibit damage thereto and also provides an arrangement for aiding in "passing" the deflated tire around the wheel rim as the wheel continues to rotate.

Still another object of the present invention is to provide a movable bearing surface on a wheel rim of a heavy vehicle or carrier such as a truck or airplane which provides a means for effecting relative movement between the tire and the wheel rim as the deflated tire continues to rotate on the rim.

Still another object of the present invention is to provide a resilient load carrying support surface on a wheel rim to aid in supporting a deflated tubeless tire on the wheel rim in a manner to inhibit damage thereto.

Yet a further object of the present invention is to provide on a wheel rim a movable surface which engages the interior of a deflated tubeless tire and supports the tubeless tire for continued rotation on the wheel rim and enables relative movement between the tubeless tire and the wheel rim in a manner to "pass off" the tubeless tire around the wheel rim as it rotates.

Other objects and advantages of the present invention will become more apparent from a consideration of the following description and drawings wherein:

FIG. 1 is a side view partly in section showing one form of the present invention mounted on a wheel rim and a portion of a tire;

FIG. 2 is a sectional view on the line 2—2 of FIG. 1 and illustrates one form of the bearing means for supporting the form of the present invention shown in FIG. 1 on a wheel rim in a manner to accommodate relative movement between the support member, the tire, and the wheel rim;

FIG. 3 is an enlarged view illustrating one form of connecting the semicircular members of the form of the present invention shown in FIG. 1 on a wheel rim;

FIG. 4 is a view similar to FIG. 1 but showing an alternate form of bearing and tire engaging arrangement;

FIG. 5 is a sectional view on the line 5—5 of FIG. 4 illustrating a means of connecting the portions which form the circular member together; and FIG. 6 is a sectional view on the line 6—6 of FIG. 4 illustrating further structural details of support of the present invention.

Attention is first directed to FIG. 1 of the drawings wherein a portion of a tubeless tire is represented by the numeral 4. The tubeless tire 4 is carried on the wheel rim 5 with the annular edges of the tire 4 being engaged against an annular upstanding edge along each side of the wheel rim 5 in a manner well known in the art.

The wheel rim 5 includes a central web portion 6 which is of a particular configuration for receiving and supporting the circular member formed by the semicircular members 7 and 8 of the present invention. While the present invention is described in detail in relation to two semicircular portions 7 and 8, it can be appreciated that in some circumstances it may be desirable to provide more than two portions, in which case members 7 and 8 would be divided into a plurality of portions as desired.

The semicircular members 7 and 8 each include an outer surface 9 thereon which is a configuration so that it will engage the inner surface 10 of the tubeless tire when it is deflated and support the deflated tubeless tire in radially spaced relationship relative to the wheel rim 5. It is to be noted that the surface 9 of each of the members 7 and 8 is substantially continuous and may be of any general configuration so that it will not present any sharp edges or surfaces to the interior surface 10 of the tire when it is engaged therewith.

The semicircular members 7 and 8 are joined together at their abutting edges 11, 12, 13, and 14, respectively, in a manner as will be described in greater detail hereinafter with regard to FIG. 3.

It will be noted that as illustrated in the drawings, the semicircular members 7 and 8 each include a central web portion 17 which may be integrally joined with the outer surface 9 as illustrated in the drawings and extends inwardly to terminate in the oppositely flared portions 18 and 19. It will be also noted that each semicircular member 7 and 8 includes the radially extending portion 22 which is circumferentially spaced along the continuous rib 17 about each of the semicircular members 7 and 8. The radially extending circumferentially spaced portions 22 provide additional rigidity and support to the construction of the present invention and also form a means for receiving the bearing means designated generally by the numeral 30 in the drawings.

The bearing means 30 support each of the semicircular members 7 and 8 on the central web 6 of the wheel rim 5 and provide a means for accommodating relative rotation or free rotation between the members 7 and 8 and the wheel rim 5 upon which they are mounted. As shown in the drawings, the bearing means 30 is in the form of the ball means 31 which are carried in the sockets 32. The sockets 32 in turn may be engaged in the members 22 by suitable means such as the threads 23 thereon which are adapted to engage with the threads 24 formed in the hole 25 in the support 22.

Received within the socket 32 is the spring 35 which rests on the inner end of the hole or opening 25 and abuts the fitting 36, which fitting 36 in turn engages the ball member 31. As shown in the drawings, there is a bearing means 30 formed on each side of the support 32 and extends at an angle on each side of the support 22 to be engaged in the bearing receiving surface 40 formed in the web 6 of the wheel rim 5. Thus, this arrangement enables the semicircular members 7 and 8, when secured together on the wheel rim 5, to be freely movable relative to the wheel rim and to aid in "passing off" the deflated tubeless tire around the wheel rim as the wheel rim 5 continues to rotate.

In FIG. 3 of the drawings, there is illustrated one means of connecting the semicircular members 7 and 8 together on the wheel rim 5. As shown in FIG. 3, the central web 17 in one of the semicircular members, for example, the member 8, is provided with a projection 42 which is adapted to be received in an opening 43 of the semicircular member 7. A pin 44 fits through an elongated slot 45 formed in the projection 42 so as to lock the projection 42 in the opening 43 while accommodating relative movement between the members 7 and 8 by reason of the difference in diameter of the pin 44 and the length of the slot 45. An additional projection 50 may be formed on the semicircular member 7 and extended into an opening 51 formed in the member 8 in a manner similar to that described with regard to the projection 42 fitting within the opening 43. A pin 52 may be secured through an elongated slot 53 in the projection 50 to further aid in retaining the members 7 and 8 locked together.

It can be appreciated that the projection 42 and the projection 50 may be integrally formed with their respective semicircular members 7 and 8. A similar projection may be provided adjacent the abutting edges of the semicircular members 7 and 8 at their other ends so as to firmly secure the members 7 and 8 in position on the wheel rim 5.

The above arrangement enables the members 7 and 8 to be secured on the wheel rim 5 and yet accommodates some relative movement of the members 7 and 8 as the arrangement initially moves into engagement with the inner surface 10 of a deflated tubeless tire. Thereafter, the edges 11 and 12 and 13 and 14 of each of the members 7 and 8 would be in abutting relationship to carry the load of the vehicle. It can be appreciated that other forms of connection between the semicircular members 7 and 8 may be provided without departing from the scope of the present invention.

The bearing means 30 illustrated in FIG. 2 of the drawings enables the members 7 and 8 to move relative to the wheel rim 5 upon which they are supported and provides a means of "passing off" the portion of the deflated tire immediately in front of the wheel rim as the wheel rim rotates. Also, the bearing means 30 in effect provides a moving or movable surface on the wheel rim which engages the inner surface 10 of the deflated tire and not only supports the deflated tire off the wheel rim during rotation thereof, but the movable relationship of the members 7 and 8 to the wheel rim and to the tire 10 inhibits damage thereto.

The resilient loading of the ball members 31 by the spring 35 accommodates "shock loading" of the members 7 and 8 such as may occur when the invention is utilized on an airplane or aircraft and it comes in for a landing with a deflated tire.

FIGS. 4, 5, and 6 illustrate an alternate form of the present invention. A portion of a tubeless tire is again represented by the numeral 4, the tubeless tire 4 being carried on the wheel rim 5 with the annular edges 60 and 61 of the tire being engaged against an annular upstanding edge 5a and 5b along each side of the wheel rim as better illustrated in FIG. 6 of the drawings.

It will be noted that the wheel rim 5 of the form shown in FIG. 6 of the drawings is split circumferentially into portions 63 and 64 which are engaged together by the means referred to generally at 70.

The drum of the wheel is referred to at 80, and bracket means 81 which extends circumferentially of the portion 63 is secured to or integrally formed with the portion 63 of the wheel rim 5 and in turn bolted to the face 82 of the drum 80 by means of the bolts 83 which are circumferentially spaced about the face 82 and bracket means 81.

The circular member which is provided in the deflated tire are supported on the wheel rim so as to engage the tire when it deflates to enable the vehicle to continue movement without damage to the car is again illustrated as being formed of semicircular members 7a and 8a. It can be appreciated, of course, that while semicircular members are illustrated, in some situations it may be desirable to divide the semicircular members into more than two members, but the preferred form of the invention is as illustrated in the drawings.

Each member 7a and 8a is of similar construction, the details of which are better illustrated in FIGS. 5 and 6 of the drawings. The structural details of semicircular member 8a will be described, it being realized that the structural details of 7a are identical thereto. In FIG. 6, the member 8a is shown as including the channel member represented generally at 84 which has the upstanding side portions 85 and 86 spaced by the web 87. A plurality of rollers 90 is mounted circumferentially of the members 7a and 8a, the rollers 90 being circumferentially spaced as illustrated in FIG. 4 of the drawings. The rollers 90 are carried on the shaft 91 which is secured to the shoulders 92 and 93 formed at the upper edge of the side portions 85 and 86. The shaft 91 is secured to shoulders 92 and 93 by suitable means such as bolts 94 or the like extending through each end of the shaft 91 and through the shoulders 92 and 93.

The rollers 90 may be formed of any suitable material such as plastic or the like, and the surface of the shaft 91 which extends through the rollers 90 provides a bearing surface upon which they may roll when they engage a deflated tire as will be described in greater detail hereinafter. Secured to the bottom web 87 of the members 7a and 8a is the member 97 which may be formed integrally with the member 8a or secured thereto by any suitable means. The member 97 extends laterally beyond the side portions 85 and 86 as shown in FIG. 6 of the drawings and provides a means for supporting the members 7a and 8a on the wheel rim 5 and within the tire 4 when the unit is completely assembled.

To this end it will be noted that annular members 98 and 99 are secured to the portions 63 and 64 of the wheel rim 5 by any suitable means such as welding and extends circumferentially thereof to provide spaces 98a and 99a in which are received the projections 97a and 97b. The member 97 extends circumferentially of the web 87, and the end portions 97a and 97b thereof are adapted to be received within the spaces 98a and 99a for holding the members 7a and 8a in position on the tire rim and within the tire 4.

The portion 63 of the wheel rim 5 includes a projecting annular edge portion 63a which may be secured to the member 63 by any suitable means or may be formed integrally therewith. A plurality of circumferentially spaced holes 63b are provided therein for receiving the bolt 71 as shown in FIG. 6. The member 74 in turn is provided with an annular edge portion 64a which is adapted to mate with and abut against the edge portion 63a of the portion 63 of the wheel rim 5 so that the bolt 71 may extend therethrough and when engaged by the nut 72 serves to lock the portions 63 and 64 together. If desired, a suitable seal as shown at 63c may be provided to seal between the annular edge portions 64a and 63a to inhibit leakage of fluid pressure from the tire.

The lower edge 73 of the annular edge portion 63a is secured to the bracket 81 by any suitable means such as the weld 74 or the like. The bracket 81 extends circumferentially of each of the semicircular members 7a and 8a as previously noted, and it will be noted that the edge 75 of the annular edge portion 64a also abuts the bracket 81 and rests thereon.

In assembling the form of the present invention, either the portion 63 or the portion 64 is laid along one edge of the tire. The members 7a and 8a are then inserted in the tire, and the circumferentially extending edge portion 97a or 97b is fitted into either the slot 98a or the slot 99a, depending upon whether the portion 63 or 64 is first laid on the tire. When the members 8a and 7a have been positioned in the tire, the hooks 100 mounted on the portions 7a and 8a engage the projecting lugs 101 to retain the members 7a and 8a in position in the tire. It will be noted that the hook 100 is constructed so that some movement can occur between the ends of the portions 7a and 8a, thereby accommodating some radial movement of the portions 7a and 8a within the tire as desirable or necessary.

After the members 7a and 8a have been secured on one portion of the wheel rim 5, the other circular portion of the wheel rim 5 may be laid against the tire and positioned so that the projecting edge, either 97a or 97b is engaged with its respective slot 99a or 98a depending upon which portion 63 or 64 is to be last placed on the tire. The bolts 71 may then be inserted through the continuous circular, annular edge portions 63a and 64a, respectively, for locking the portions 63 and 64 together and for retaining the members 7a and 8a in position in the tire as described.

When the components are assembled as shown in FIG. 6, the circular bracket 81 formed on the portion 63 of the wheel rim 5 may then be engaged on the drum or wheel of the vehicle by inserting bolts 83 through the face 82 and holding them in position with the nuts 84a.

It is to be noted that the bearings 90 of the present invention are circumferentially spaced of the members 7 and 8 and that the bearings provide an annular surface which directly contacts the inner periphery of the vehicle tire 4 when it deflates. The lateral spacing of the rollers 90 permits the bunched up portion of the deflated tire adjacent the earth's surface to be passed therebetween without damage to the vehicle tire.

One of the great difficulties encountered in providing a suitable device for enabling a vehicle to move on a deflated tire at the present time is that the deflated tire tends to bunch up immediately in front of the contact of the deflated tire with the surface over which it is moving. This is partially due to the fact that the momentum of the deflated tire itself moves it against the surface and partially due to the fact that the friction between the deflated tire and the surface over which it is moving prevent the tire from flowing freely therebetween.

The roller arrangement disclosed herein provides a plurality of moving surface which directly engages the inner surface of the tire, and the spacing of the rollers 90 enables the bunched up portion of the deflated tire to move freely around the wheel as it rotates without inhibiting any movement and without damaging the tire.

It can be appreciated that the exact form of bearing means may be varied without departing from the scope of the present invention, its main object to serve as a means for accommodating relative movement between the surface which engages the inner surface 10 of the deflated tire and the wheel rim 5 upon which the tire is carried.

Broadly, the present invention relates to an arrangement for providing a movable surface for mounting on a wheel rim to engage a deflated tire and enables rotation of the deflated tire on the wheel rim without damage thereto.

What is claimed is:

1. A device to be positioned inside a tubeless tire and secured on a wheel rim which supports the tire including,
   (a) two semicircular members each having an inner surface surrounding the circumference of the wheel rim,
   (b) a movable bearing means on each of said members and abutting the wheel rim to support said members thereon,
   (c) means connecting said semicircular members together on the wheel rim, said means accommodating radial expansion of said semicircular members, and
   (d) each of said members having an outer surface for engaging a tire carried on the wheel rim when the tire deflates.

2. The invention of claim 1 wherein said movable bearing means includes resiliently supported ball bearings to absorb shock loading of said members while accommodating relative movement between said members and wheel rim.

3. A device to be positioned inside a tubeless tire and secured on a wheel rim which supports the tire including,
   (a) a plurality of members each having an inner surface surrounding the circumference of the wheel rim,
   (b) a movable bearing means on each of said members and abutting the wheel rim to support said members thereon,
   (c) means connecting said members together on the wheel rim, said means accommodating radial expansion of said members, and
   (d) each of said members having an outer surface for engaging a tire carried on the wheel rim when the tire deflates.

4. A device to be positioned inside a tubeless tire and secured on a wheel rim which supports the tire including,
   (a) a plurality of members each having an inner surface surrounding the circumference of the wheel rim,
   (b) a movable bearing means carried by said members,
   (c) means connecting said members together on the wheel rim, said means accommodating radial expansion of said members, and
   (d) said member and bearing means cooperating to provide a movable surface for engaging the inner periphery of the tire when deflated.

References Cited by the Examiner

UNITED STATES PATENTS 3,049,162   8/62   Rosenbaum et al. _____ 152—158

FOREIGN PATENTS 350,128   8/05   France.
836,738   10/38   France.
844,482   4/39   France.

ARTHUR L. LA POINT, *Primary Examiner.*